United States Patent Office 3,433,795
Patented Mar. 18, 1969

3,433,795
TRICYCLIC ESTER DERIVATIVES OF PYRIDINE CARBOXYLATES AND PROCESS FOR THEIR PRODUCTION
Seymour Hyden, Spring Valley, Louis Scarano, Middletown, and Godfrey Wilbert, Carmel, N.Y., assignors to Nepera Chemical Co., Inc.
No Drawing. Filed Aug. 12, 1966, Ser. No. 571,998
U.S. Cl. 260—295.5
Int. Cl. C07d 31/34; C08f 45/44; C08g 51/44
4 Claims

ABSTRACT OF THE DISCLOSURE

The present invention discloses compounds such as 8 - tricyclodecyl - (5,2,1,0$^{2,6}$) - nicotinate, 8 - tricyclo-4-decenyl-(5,2,1,0$^{2,6}$)-nicotinate and tricyclodecan-(5,2,1,0$^{2,6}$)methylyl nicotinate. These compounds are useful as plasticizers.

This invention relates to novel pyridine carboxylic esters of the formulas:

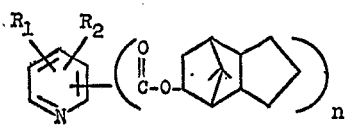

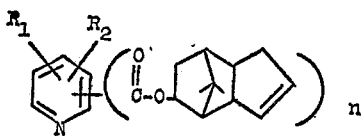

and

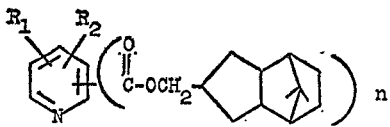

wherein $R_1$ and $R_2$, which may be equal or different, represent hydrogen, lower alkyl, halogen, nitro, lower alkoxy or acyl and $n$ is an integer from 1 to 2.

In the above definitions for $R_1$ and $R_2$ the term "lower alkyl" and the lower alkyl portion of "lower alkoxy" contain from 1 to 6 carbon atoms such as methyl, ethyl, propyl, isopropyl, butyl and isobutyl. Halogen includes all four members of its family, i.e. chlorine, bromine, iodine and fluorine.

The term "acyl" is the residue derived from a carboxylic acid such as acetyl, benzoyl and the like.

In the formulas above, $R_1$ and $R_2$ are preferably substituted at the positions ortho or meta to the nitrogen of the pyridine nucleus.

The compounds of this invention are useful as industrial chemicals such as plasticizers.

In order to use these compounds as plasticizers they may be added to polyvinyl chloride or cellulosic resins in 10–40% concentration before milling. The mechanical strength and thermal stability of the resin are thereby improved.

According to the process of this invention, these compounds are prepared by reacting tricyclic alcohols of the formulas:

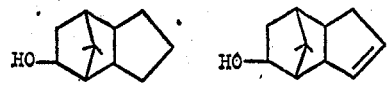

and

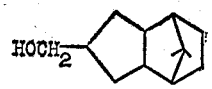

with pyridine carboxylic acid chlorides of the formula:

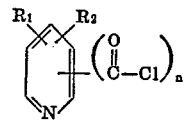

in which $R_1$ and $R_2$ are as defined. This reaction is effected at a temperature of $-10°$ C. to $50°$ C. in a solvent system consisting of pyridine or an alkyl pyridine. The desired reaction product may be recovered from the reaction mixture by diluting with ice-water, followed by extraction with a solvent such as ether or benzene, if necessary. The crude product may be purified using distillation or crystallization techniques.

In order to further illustrate the practice of this invention, the following examples are given:

EXAMPLE 1

8-tricyclodecyl-(5,2,1,0$^{2,6}$)-nicotinate

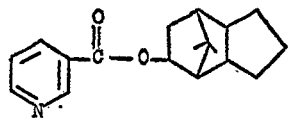

22.9 g. of 8-oxytricyclodecan-(5,2,1,0$^{2,6}$) are dissolved in 50 ml. of pyridine and cooled to 0° C. 22.8 g. of nicotinyl chloride are added, dropwise, with stirring while maintaining the temperature at 0° C. to 40° C. The reaction mixture is then stirred one hour and added to 200 ml. of ice-water to afford an oil. The product is extracted with ether and the ester is obtained by distillation at 175–180° C./2 mm.

EXAMPLE 2

8-tricyclo-4-decenyl-(5,2,1,0$^{2,6}$)-nicotinate

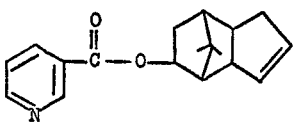

In an analogous manner as described in Example 1, 22.5, g. of 8-oxytricyclo-4-decene-(5,2,1,0$^{2,6}$) are reacted with 22.8 g. of nicotinyl chloride and the ester is obtained by distillation at 170–175° C./1–2 mm.

EXAMPLE 3

Tricyclodecan-(5,2,1,0$^{2,6}$)-methyl nicotinate

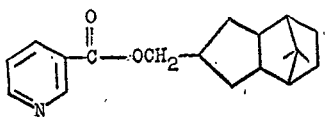

In an analogous manner as described in Example 1, 25.0 g. of tricyclodecan-(5,2,1,0$^{2,6}$) methylol are reacted with 27.0 g. of nicotinyl chloride and the ester is obtained by distillation at 187–190° C./2 mm.

It is understood that the foregoing detailed description is given merely by way of illustration and that many variations may be made therein without departing from the spirit of our invention.

Having described our invention, what we desire to secure by Letters Patent is:

1. A member selected from the group consisting of compounds of the formulas:

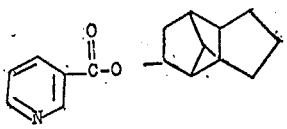

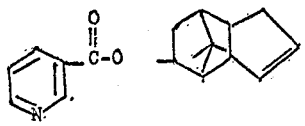

and 2. 8-tricyclodecyl-(5,2,1,0$^{2,6}$)-nicotinate.
3. 8-tricyclo-4-decenyl-(5,2,1,0$^{2,6}$)-nicotinate.
4. Tricyclodecan-(5,2,1,0$^{2,6}$)-4-methylyl nicotinate.

References Cited

Kaufmann et al., Chem. Abstracts, vol. 63, par. 6881-i–6882-b, September 1965.

HENRY R. JILES, *Primary Examiner.*

ALAN L. ROTMAN, *Assistant Examiner.*

U.S. Cl. X.R.

260—30.2, 295